United States Patent [19]
Osada et al.

[11] Patent Number: 4,645,684
[45] Date of Patent: Feb. 24, 1987

[54] METHOD FOR FORMING DEPOSITED FILM

[75] Inventors: Yoshiyuki Osada, Yokosuka; Hisanori Tsuda, Atsugi; Masafumi Sano, Kawasaki; Satoshi Omata, Tokyo; Katsuji Takasu, Asaka; Yutaka Hirai, Tokyo, all of Japan

[73] Assignee: Canon Kabushiki Kaisha, Tokyo, Japan

[21] Appl. No.: 783,490

[22] Filed: Oct. 3, 1985

[30] Foreign Application Priority Data

Oct. 9, 1984 [JP] Japan ................... 59-210492

[51] Int. Cl.$^4$ .............................................. B05D 3/06
[52] U.S. Cl. .................................. 427/38; 427/41; 427/53.1; 427/54.1; 427/55
[58] Field of Search ............. 427/53.1, 54.1, 38, 427/55, 41

Primary Examiner—Bernard D. Pianalto
Attorney, Agent, or Firm—Fitzpatrick, Cella, Harper & Scinto

[57] ABSTRACT

A method for forming a deposited film comprises forming in a vacuum chamber housing a substrate therein a deposited film containing silicon on the substrate by subjecting a gas represented by the general formula:

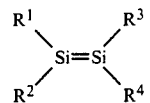

wherein $R^1$, $R^2$, $R^3$ and $R^4$, can be the same or different and are each independently hydrogen or a hydrocarbon group, to polymerization.

7 Claims, 2 Drawing Figures

METHOD FOR FORMING DEPOSITED FILM

BACKGROUND OF THE INVENTION

1. Field of the Invention

This invention relates to a method for forming a desired deposited film on a substrate by introducing starting gases into a vacuum chamber, giving an appropriate energy such as heat, gas plasma, light, etc., thereby causing the starting gases to undergo decomposition or other chemical reactions, particularly to a method for formation of a deposited film containing silicon.

2. Description of the Prior Art

In the prior art, as the method for forming a deposited film of amorphous silicon (hereinafter written as "a-Si"), there have been known the glow discharge deposition method, the heat energy deposition method or the light energy deposition method employing $SiH_4$ or $Si_2H_6$ as the starting gas.

However, in the deposited film containing silicon formed from the above starting gas, although there is a slight difference depending on the deposition method, Si—H bondings and Si—$H_2$ bondings are contained in amounts on the same order, ad it has been impossible to obtain a deposited film containing selectively either one type of the bondings in greater amount.

On the other had, according to D. I. Wolford et al. (Appl. phys. Lett. 42(4), Feb. 15, 1983), in the deposited film formed by heating only the starting gas to high temperture, while maintaining the substrate at around room temperature, strong luminescence is observed in the visible region, suggesting strongly the relationship between its intensity, the defect density of the film measured by the electron spin resonance method and the amount of Si—$H_2$ bondings contained in the film. For example, as Si—$H_2$ bondings or —(Si—$H_2$)$_n$—chains in the film are increased, the defect density will be reduced and the photoluminescence intensity will be increased.

Such a method of Wolford et al is a method in which the product substance through the reaction in gaseous phase is directly deposited on the substrate, while suppressing the reaction in the substrate by maintaining the substrate at a low temperature, whereby the amount of Si—$H_2$ bondings in the film can be increased, but not to a satisfactory extent.

Thus, in the methods for forming deposited film of the prior art as described above, the amount of Si—$H_2$ bondings which determine the quality of the deposited film could not satisfactorily be increased.

SUMMARY OF THE INVENTION

It is, therefor, an object of the present invention to provide a method for forming a deposited film which can overcome the problems of the prior art as described above and form a deposited film of good quality with a great photoluminescence intensity.

According to the present invention, there is provided a method for forming a deposited film comprising forming in a vacuum chamber housing a substrate therein a deposited film containing silicon on the substrate by subjecting a gas represented by the general formula I:

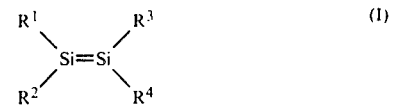

wherein $R^1$, $R^2$, $R^3$ and $R^4$ can be the same or different and are each independently hydrogen or a hydrocarbon group (hereinafter referred to as silylene gas), to polymerization.

Here, as the above hydrocarbon group, there may be included saturated or unsaturated aliphatic hydrocarbon group, aromatic hydrocarbon group, alicyclic hydrocarbon group, etc., specifically alkyl groups (methyl, ethyl, propyl, butyl, etc.), aryl groups (phenyl, tolyl, etc.), preferably alkyl group and phenyl group.

Examples of the compounds represented by the general formura I include those as enumerated below:

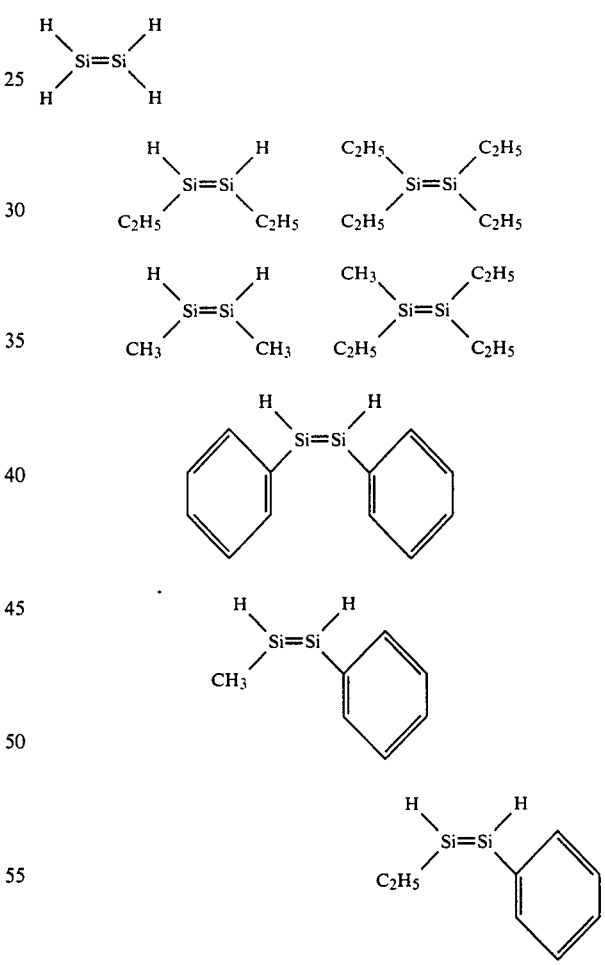

DESCRIPTION OF THE PREFERRED EMBODIMENTS

Figure 1:
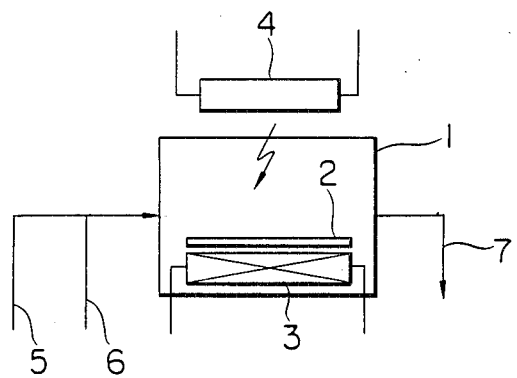
FIG. 1 is an illustration of the constitution of an example of the CVD device utilizing the light energy to be used for an embodiment of the present invention.

The deposited film containing silicon formed by the method according to the present invention may be either crystalline or amorphous, and the bondings of silicon in the film may be in any form such as oligomer and polymer.

In the present invention as the excitation energy to be used for excitation and polymerization of silylene, any one of plasma energy, heat energy or light energy may be available. Also, a composite of them may be useful.

The silylene gas subjected to the action of the above excitation energy will open its double bond to be activated. The activated gas molecules, will be polymerized with other activated gas molecules, whereby —(Si—$H_2$)$_n$—chains will readily be formed.

Referring now to the drawings, preferred embodiments of the present invention are to be described.

FIG. 1 is a diagrammatic illustration of the constitution of a CVD device utilizing light energy to be used for a first embodiment of the present invention.

In this Figure, in the vacuum chamber 1 for carrying out deposition of a deposited film, a substrate 2 and a heating bath 3 for setting the substrate 2 to a desired temperature are arranged. Also, a light source 4 is arranged above the vacuum chamber 1, and the light from the light source 4 is irradiated vertically through the window provided at the vacuum chamber onto the substrate 2.

Hydrogen gas and silylene gas are introduced into the vacuum chamber 1 through conduits 5 and 6, respectively, and discharged through a discharging conduit 7. The starting gas silylene may be either gaseous or liquid, but when it is liquid at room temperature, it is previously vaporized by means of a vaporizer before being introduced through the conduit 6 into the vacuum chamber 1. Also, the silylene gas may be introduced as a mixture in an appropriate ratio with the hydrogen gas fed through the conduit 5, if desired, into the vacuum chamber 1.

The above starting gas introduced into the vacuum chamber 1 is excited by the light energy from the light source 4 to be polymerized, thereby forming a deposited film on the substrate 2.

As the light source 4, for example, mercury lamp, xenon lamp, carbon dioxide laser, argon ion laser, excimer laser, nitrogen laser, dye laser, etc. may be employed.

The gas pressure within the vacuum chamber 1 during formation of the deposited film is maintained at 0.1 Torr to normal pressure, and the temperature of the substrate 2 at room temperature to 300° C., preferably up to 100° C.

The light energy used in this embodiment is not limited to UV-ray energy, but any light which can excite the starting gas and consequently bring about polymerization reaction of silylene may be available, irrespective of its wavelength region. Also, the method, in which the starting gas is excited by the heat energy after absorption of the light energy by the starting gas and the substrate 2, belongs to the embodiments of the present invention.

Figure 2:
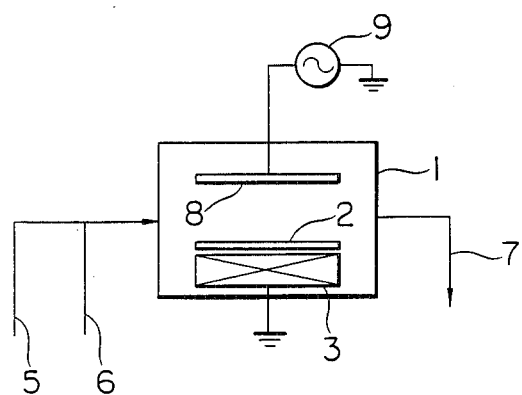
FIG. 2 is a illustration of the constitution of an example of the plasma CVD device to be used for another embodiment of the present invention.

FIG. 2 is a diagrammatic illustration of the constitution of an example of the plasma CVD device to be used in a second embodiment of the present invention. In this Figure, the vacuum chamber 1, the substrate 2, the heating bath (heater) 3 and the evacuation conduit 7 have the same constitutions as those in FIG. 1, but, in this embodiment, an electrode 8 for plasma glow discharging is provided in parallel to the substrate 2 in the vacuum chamber 1 and connected to a high frequency power 9.

Similarly as above, the silylene gas, optionally together with hydrogen gas are introduced into the vacuum chamber 1. Subsequently, high frequency power is supplied to the electrode 8 to excite plasma glow discharging, thereby exciting the above starting gas, etc. to carry out polymerization and form a deposited film on the substrate 2.

The gas pressure in the vacuum chamber 1 during deposition of the deposited film is maintained at 0.1 Torr to 5 Torr, and the temperature of the substrate 2 at room temperature to 300° C., preferably up to 100° C.

As described above by referring to the first and the second embodiments of the present invention, by excitation and polymerization of the silylene gas, a deposited film containing a large amount of —(Si—$H_2$)—chains can easily be formed.

As described in detail above, the method for forming a deposited film according to the present invention employs silylene as the starting gas and can provide easily a deposited film containing a large amount of —(Si—$H_2$)$_n$—chains by excitation and polymerization thereof.

Also, the deposited film formed by the method of the present invention, because it contains selectively a large amount of —(Si—$H_2$)$_n$—chains, can give a deposited film of good quality which is low in defect density and great in photoluminescence intensity.

We claim:

1. A method for forming a deposited film, comprising subjecting a gas represented by the formula:

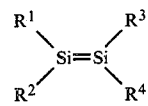

wherein $R^1$, $R^2$, $R^3$ and $R^4$ are the same or different and are each independently hydrogen or a hydrocarbon group, in a vacuum chamber housing a substrate therein, to at least one energy selected from the group consisting of plasma energy, light energy and heat energy to hereby polymerize said gas and form a deposited film containing silicon on the substrate.

2. The method according to claim 1, wherein the energy is plasma energy.

3. The method according to claim 1, wherein the energy is heat energy.

4. The method according to claim 1, wherein energy is light energy.

5. The method according to claim 1, wherein at least one of $R_1$, $R_2$, $R_3$ and $R_4$ is hydrogen.

6. The method according to claim 1, wherein at least one of $R_1$, $R_2$, $R_3$ and $R_4$ is alkyl.

7. The method according to claim 1, wherein at least one of $R_1$, $R_2$, $R_3$ and $R_4$ is aryl.

* * * * *